UNITED STATES PATENT OFFICE.

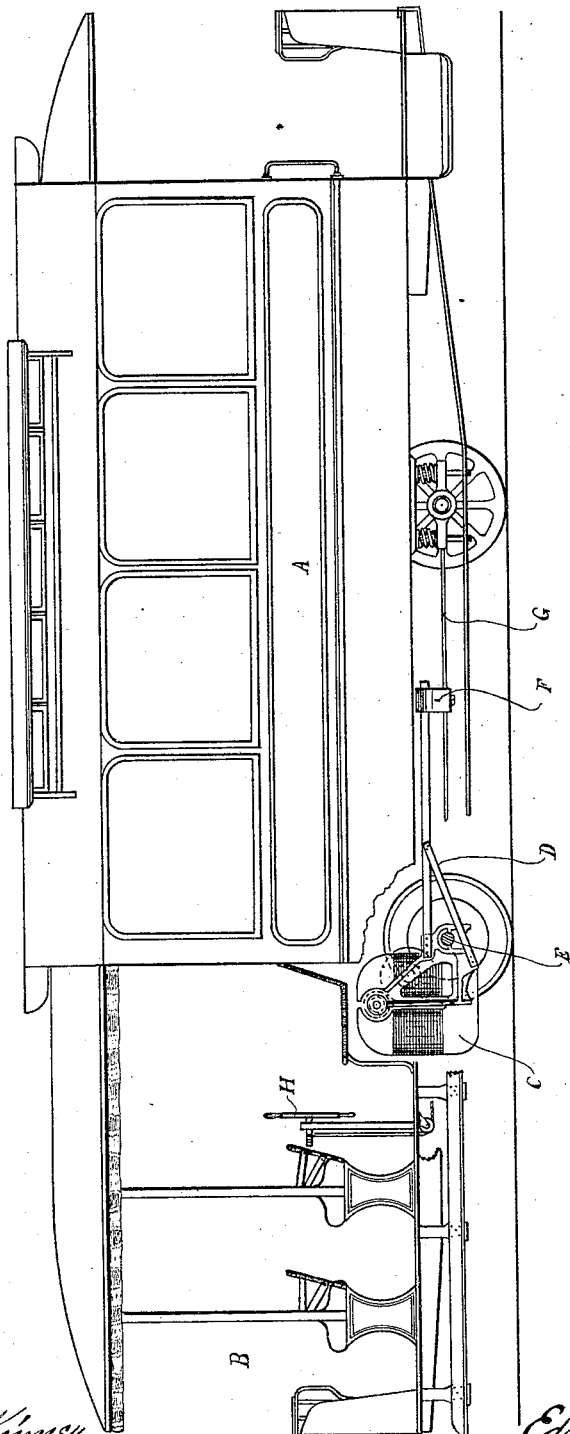

EDWARD M. BENTLEY, OF NEW YORK, N. Y.

ELECTRIC-MOTOR CAR.

SPECIFICATION forming part of Letters Patent No. 454,021, dated June 16, 1891.

Application filed June 13, 1888. Serial No. 277,004. (No model.)

*To all whom it may concern:*

Be it known that I, EDWARD M. BENTLEY, a citizen of the United States, residing at New York, in the county of New York, State of New York, have invented certain new and useful Improvements in Electric-Motor Cars, of which the following is a specification.

My invention relates to electric railways; and it consists in a combined open and closed car and a motor for propelling the same supported upon the axles and located so as to be accessible from above the floor of the car.

The invention is illustrated in the accompanying drawing, in which the figure is a side elevation, partly in section, of a car having my improvements attached thereto.

As will be seen by reference to the drawing, my invention is constructed with the ordinary closed-car body A and an extension in front B, which is of the open-car form. The propelling electric motor C, which is of any well-known construction, is placed just in front of one axle of the car, with its field-magnets vertically arranged and its pole-pieces and armature uppermost, so that the armature and bearings are elevated up as far as possible from the dirt of the street and are readily accessible for inspection or repairs. The motor is supported upon the frame D, which is journaled on axle E, and is counterbalanced by having an extension caught under cross-bar F, which joins the side rods G, connecting the axle-boxes of the car-truck. In this way the weight of the motor exerts a leverage upon axle E, so as to transfer to said axle the main weight, not only of the motor, but of the car itself. The car-body is spring-supported from the axle-boxes in the usual manner and is independent of the motor, although the latter extends up between the open and closed parts of the car, where it may be readily inspected by the driver.

H is a controlling-wheel for the brakes and the motor, and is situated behind the seats placed in the open part of the car. The driver can thus by standing up have an unobstructed view of the track ahead and yet be near the motor for any inspection which may be necessary.

What I claim as new, and desire to secure by Letters Patent, is—

1. An electric motor journaled on an axle of a truck which it drives and arranged in an upright position, with its pole-pieces and armature uppermost, as described.

2. The combination, with an electric motor arranged in an upright position, with pole-pieces and armature uppermost, of bearings journaling the lower part of the motor on an axle of a truck which it drives, and a motor-frame holding the motor in place.

3. In an electrically-driven vehicle, an electric motor journaled on an axle of a truck with its armature uppermost and extending above the floor of the car-body, as described.

EDWARD M. BENTLEY.

Witnesses:
ROBT. W. BLACKWELL,
GEO. I. BLACKWELL.